United States Patent
Chadwick et al.

(10) Patent No.: US 7,052,184 B2
(45) Date of Patent: May 30, 2006

(54) BEARING SLEEVE AND METHOD OF MAKING

(75) Inventors: Edwin R. Chadwick, Goshen, CT (US); Carey L. Linkovich, Avon, CT (US); Russel H. Marvin, Goshen, CT (US); John F. O'Connor, Jr., New Hartford, CT (US); Drew M. Rocky, Woodbury, CT (US)

(73) Assignee: Torrington Research Co., Torrington, CT (US)

( * ) Notice: Subject to any disclaimer, the term of this patent is extended or adjusted under 35 U.S.C. 154(b) by 0 days.

(21) Appl. No.: 10/672,944

(22) Filed: Sep. 26, 2003

(65) Prior Publication Data

US 2004/0175066 A1    Sep. 9, 2004

Related U.S. Application Data

(60) Provisional application No. 60/442,407, filed on Jan. 24, 2003.

(51) Int. Cl.
*F16C 19/06*    (2006.01)

(52) U.S. Cl. .................................................... 384/537
(58) Field of Classification Search ................ 384/537, 384/540, 544, 584, 585
See application file for complete search history.

(56) References Cited

U.S. PATENT DOCUMENTS 6,338,578 B1 *    1/2002    Adde et al. .................. 384/537

* cited by examiner

*Primary Examiner*—Lenard A. Footland
(74) *Attorney, Agent, or Firm*—Theodore Paulding

(57) ABSTRACT

An improved bearing mount sleeve and method of making same. The sleeve has a radial flange and body portion projecting therefrom. First and second shoulders in the body portion seat large and small bearings respectively. Crush ribs apply radial preloading and wave washers apply axial preloading. The sleeve is located by tabs on its flange and a locating element projecting from the end opposite the flange A series of drawing steps result in the sleeve form and piercing and forming steps complete the sleeve at economic advantage.

9 Claims, 4 Drawing Sheets

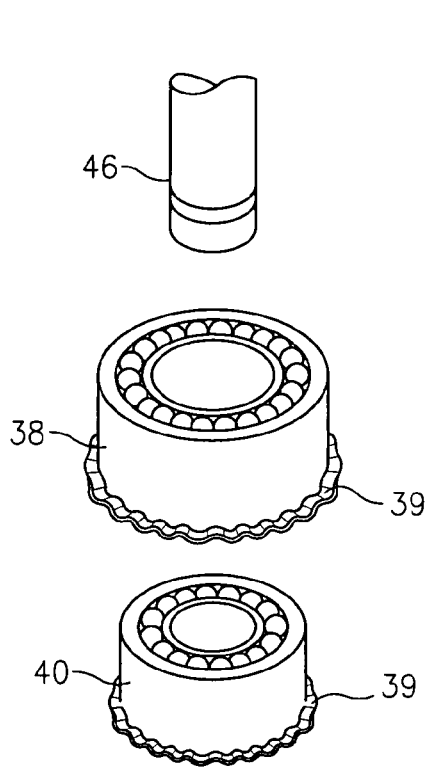
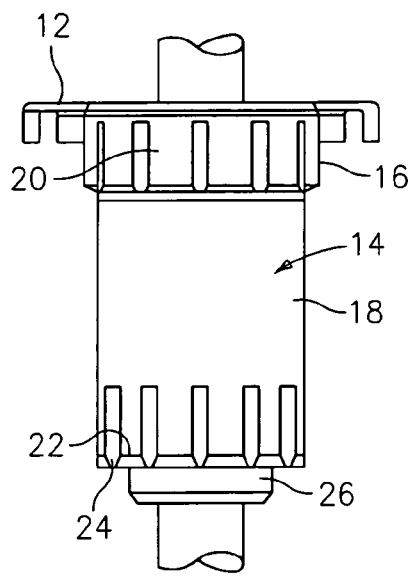
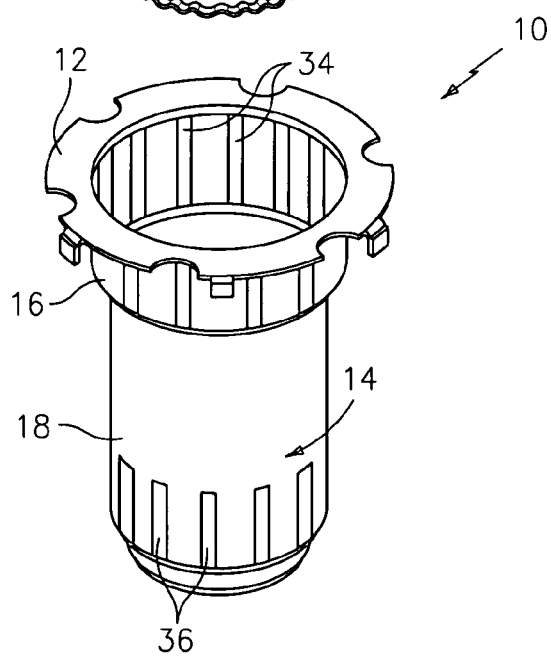
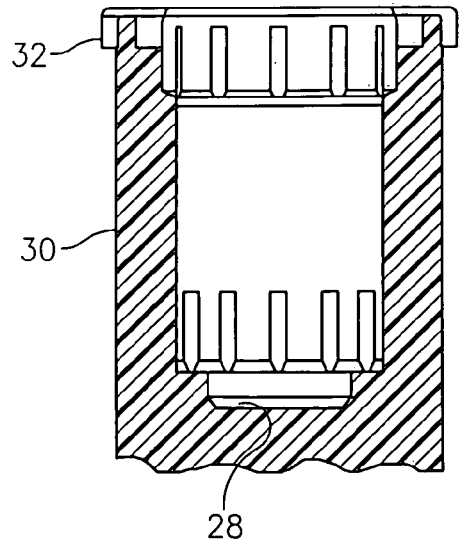
FIG. 1
FIG. 2
FIG. 2A

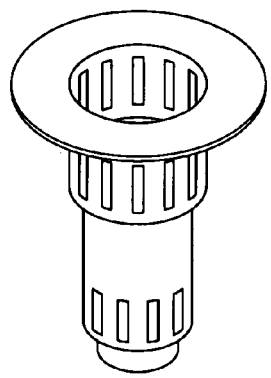
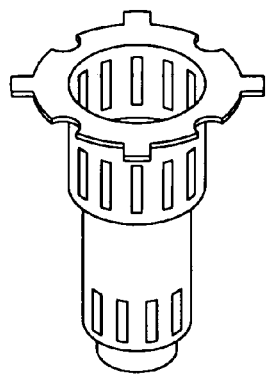
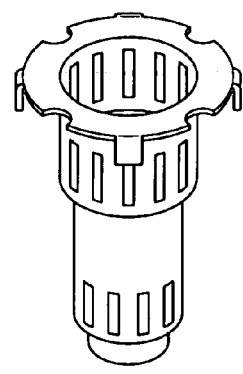
FIG. 13          FIG. 14          FIG. 15
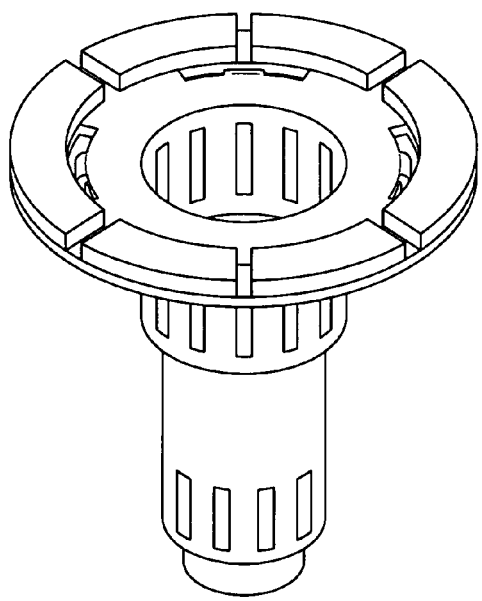
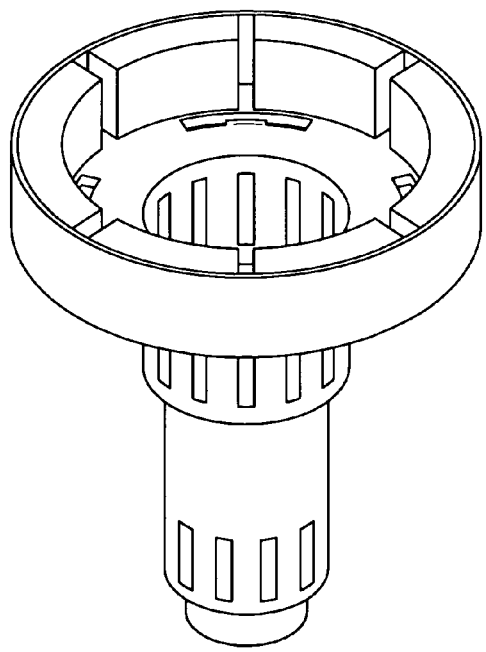
FIG. 16          FIG. 17

BEARING SLEEVE AND METHOD OF MAKING

This application claims the benefit of U.S. Provisional Application Ser. No. 60/442,407, filed Jan. 24, 2003.

BACKGROUND OF THE INVENTION

Bearing "towers" or mounting sleeves are required to exert precise axial and radial "preloads" on bearings mounted therewithin. Further, the axial alignment of two or more bearings is critical and also contributes to the need for precise tolerances in the manufacture of bearing sleeves. Sleeves machined from metal blanks are conventional and have proven generally satisfactory but difficult to manufacture at economic advantage.

It is the general object of the present invention to provide an improved bearing sleeve manufactured in a deep drawing operation at economic advantage and which yet exhibits highly efficient preload, bearing alignment and other desirable bearing mounting characteristics.

SUMMARY OF THE INVENTION

In fulfillment of the foregoing object and in accordance with the present invention, a bearing mounting sleeve takes the form of a deep drawn metal stamping with a radially extending flange at one end, a hollow cylindrical body portion integral with the flange and projecting axially therefrom and a radially inwardly extending portion at an end opposite the flange. At least one bearing locating shoulder is formed intermediate the ends of the body portion and facing toward the flange end. The shoulder extends radially inwardly from the inner wall of the body portion and around at least a substantial part of said inner wall so as to engage and axially locate one end of a bearing mounted within the sleeve.

Preferably, the body portion of the sleeve is of reduced diameter on the side of the shoulder opposite the flange and a second shoulder is formed in said section of the body. The shoulder has the same characteristics as the first shoulder and serves to axially locate a second smaller bearing mounted within the sleeve.

In one embodiment of the sleeve, the second shoulder is formed at the end of the reduced diameter section and includes a plurality of small circumaxially spaced angularly projecting fingers. The fingers extend toward the flange end of the sleeve so that a second smaller bearing engages the same when mounted within the sleeve in engagement with the second shoulder and is axially loaded by the fingers.

Spacing biasing members in the form of a wave washer or the like may also be associated with one or both of the shoulders to provide for axial preloading of the associated bearings.

In order to locate the sleeve radially, a plurality a small circumaxially spaced tabs are provided on the radial flange and are arranged to project angularly to engage a housing or the like. At its opposite end the sleeve may be provided with a small diametrically reduced end portion for cooperation with a complementary cylindrical opening in a housing or the like.

Finally, in order to precisely apply radial forces in preloading the bearings, circumaxially spaced axially elongated crush ribs are provided adjacent each shoulder and project slightly radially inwardly from the adjacent inner wall of the shell. When the bearings are mounted within the shell, they engage the ribs in a press fit and are radially preloaded as required.

The bearing mounting shell is particularly well suited to use in small brushless D.C. motors, and when used in such an environment it will apparent that the radial flange on the sleeve can be readily adapted to serve as a motor backplate in an axial motor merely by mounting an appropriate magnet thereon. Similarly, a radial motor may be provided with a backplate merely by forming the flange in a cup shape and mounting one or more magnets on the inner surface of its axially extending wall.

A number of progressive drawing steps are employed in forming the bearing sleeve with a metal blank initially taking a shallow flanged cup shape and thereafter a progressively deeper cup. The shoulders are formed during these drawing operations as well as the locating element at the end opposite the flange. A piercing step provides an opening through the locating element together with the small fingers or, alternatively, an opening through the cup wall may be provided when a locating element is not provided. This results in the second shoulder being located at the end of the sleeve and the small angular fingers may be provided during piercing of the opening for engagement and axial preloading of an associated bearing.

Finally, a further forming step provides the axially elongated crush ribs and the small locating tabs on the flange are provided by clipping and bending steps.

DRAWINGS

FIG. 1 of the drawings is an exploded perspective view showing an improved bearing mounting sleeve of the present invention together with exemplary bearings and a portion of an associated shaft.

FIG. 2 is a side elevation showing the bearing sleeve of FIG. 1.

FIG. 13 shows a forming operation which provides the axial crush ribs.

FIG. 14 shows a clipping operation which establishes the final flange shape.

FIG. 15 shows a bending operation which establishes the final angular position of the locating tabs on the flange.

FIG. 16 shows a bearing sleeve adapted to mount permanent magnets in an axial brushless D.C. motor.

FIGS. 16, 17 is similar to FIG. 16 but shows a radial D.C. motor configuration with a cup shaped flange carrying permanent magnets on its inner wall.

DESCRIPTION OF PREFERRED EMBODIMENTS

Figure 4:
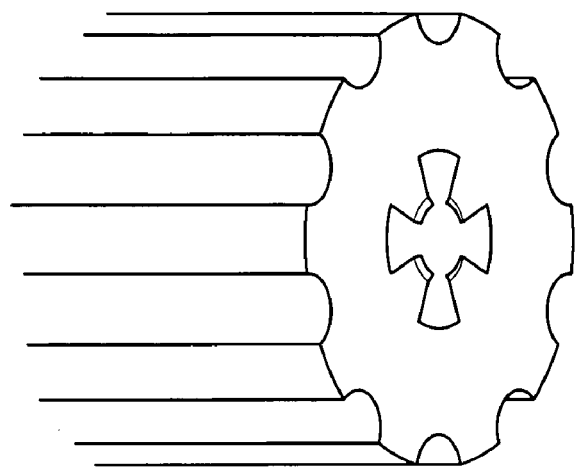
FIG. 4 is a view similar to FIG. 3 but showing an alternative embodiment of the invention wherein the sleeve has no locating element.

Referring initially to FIGS. 1 and 2, an improved bearing mounting sleeve in accordance with the invention is indicated generally at 10. A radial flange 12 is shown at an upper end thereof and a hollow cylindrical body portion 14 has upper and lower portions 16 and 18 with the lower portion somewhat reduced in diameter relative to the upper portion. Upper and lower axially spaced shoulders 20 and 22, best shown in FIG. 2, extend radially inwardly from the inner wall of the body portion 14 and face the flanged end of the body portion. Each shoulder extends around a substantial portion of the inner wall and, preferably and as shown, the shoulders are annular extending completely around the inner wall. Further, the shoulders 20 and 22 are preferably formed respectively at the junction between upper and lower body portions and at a lower end wall 24 of the sleeve.

Figure 3:
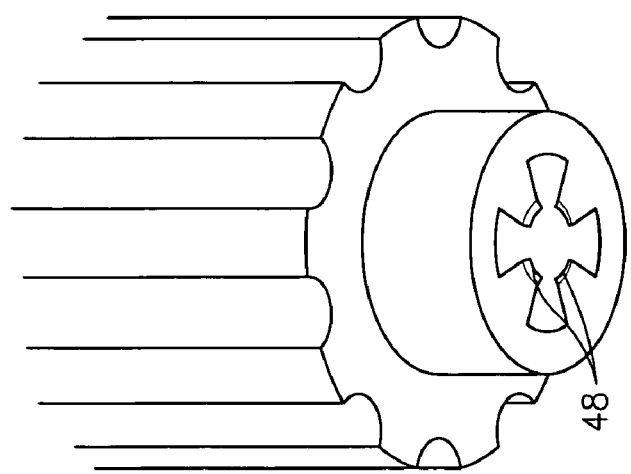
FIG. 3 is an enlarged fragmentary perspective view showing a locating element at an end of the sleeve opposite its radial flange.

Referring particularly to FIGS. 2 and 3, it will be observed that a further diametrically reduced downwardly projecting portion 26 of the sleeve 10 is provided at a lower end of the body portion 14. The portion 26 serves as a locating element which cooperates with a complementary cylindrical opening 28 in a bearing housing or the like 30 best illustrated in FIGS. 2 and 2A. As will be apparent, both radial and axial locating surfaces are located respectively at side and end walls of the element 26 and cylindrical opening 28.

The upper end of the bearing sleeve 10 is located radially by small tabs 32,32, best illustrated in FIGS. 2 and 3. The tabs 32,32 are spaced circumaxially around the flange 12 each in radially outwardly spaced relationship with the body portion 14 of the sleeve and are bent downwardly to project axially and engage a bearing housing 30 or the like for precise location of the sleeve relative to the housing, FIG. 2A.

Still further, in order to precisely locate and radially preload bearings mounted within the sleeve 10 and seated on the shoulders 20 and 22, upper and lower series of crush ribs 34,34 and 36,36 and provided adjacent the shoulders 20 and 22 on the sides thereof toward the flange 12. The ribs are elongated axially and project slightly radially inwardly from the inner wall of adjacent body portions 16 and 18 of the shell. When bearings such as illustrated at 38 and 40 respectively in FIG. 1 are forced radially into engagement with the ribs 34,34 and 36,36 in a press fit, the bearings are held securely and are both precisely located and preloaded radially.

Axial preloading of the bearings may also be required and may be readily provided by small wave washers 39,39 or the like mounted respectively on the shoulders 20 and 22 in engagement with their associated bearings.

Reverting now to FIG. 3, it will be observed that the locating element 26 has an opening 42 for receiving a shaft 44 partially illustrated in FIG. 1. The shaft 44, in a press fit assembly with the bearings 38 and 40, projects through the opening 42 and may be provided with a small radial groove as illustrated at 46 for cooperation with a series of fingers 48, 48 projecting into the opening 42. Axial location and retention of the shaft is thus enhanced as may be required.

FIG. 4 shows an alternative embodiment of the invention eliminating the locating element 26 but retaining fingers 48a or, 48a which extend angularly upwardly. With fingers 48a, 48a engaging and preloading a lower bearing 38 axially, a wave washer associated with the shoulder 22 may obviously be eliminated.

Figures 5, 6, 7, 8, 9, 10, 11, 12:
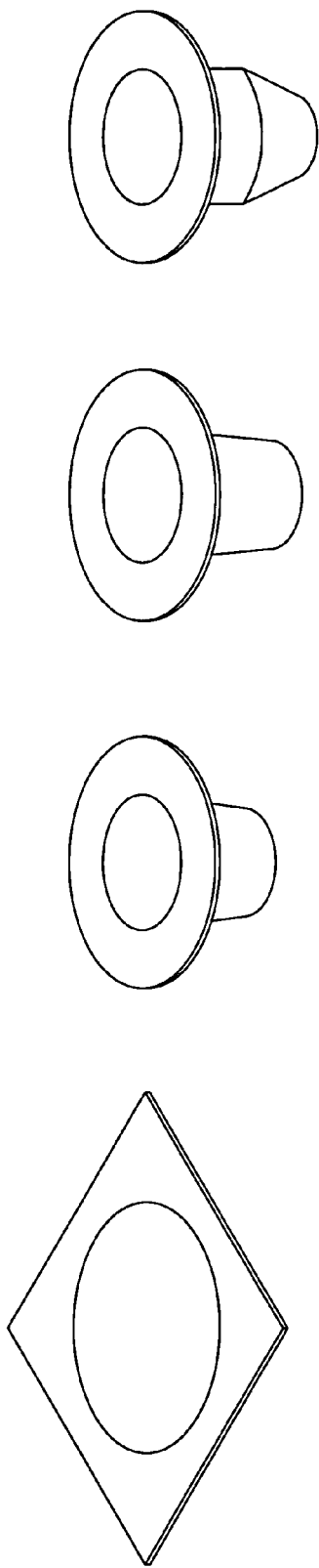
FIG. 5 shows a sheet metal blank employed in drawing a bearing mounting sleeve.
FIG. 6 shows a shallow flanged cup resulting from a first drawing step.
FIGS. 7 through 10 show progressive drawing steps in sequence, the cup being gradually deepened as required by the desired length of the bearing shell.
FIG. 11 shows a piercing step which provides an opening in a locating element or an end wall of a shell without a locating element.
FIG. 12 shows a stamping operation which establishes the desired periphery of the flange.

As indicated above the improved sleeve of the present invention can be manufactured at economic advantage in a deep drawing operation. FIG. 5 through illustrate the operation schematically with an initial step in FIG. 5 shown as providing a round blank from strip steel or the like. FIGS. 6 through 10 illustrate sequential drawing steps resulting in the sleeve of the invention in a crude form having approximately its final dimensions and configuration. In FIG. 11, a piercing step provides the above described opening 42 and fingers 48, 48 and it will be obvious that the alternative FIG. 4 embodiment can be provided in a similar step. FIG. 12 involves stamping the flange periphery, and FIG. 13 shows the forming step required in providing the ribs 34, 34 and 36, 36. In FIGS. 14 and 15 respectively, clipping and bending of the locating tabs are accomplished.

In FIG. 16 a bearing sleeve is shown with an enlarged flange carrying a plurality of permanent magnets 60, 60, six (6) in an axial brushless D.C. motor. FIG. 17 illustrates a radial D.C. motor configuration with the flange formed to a cup shape and with permanent magnets 62, 62 mounted on the wall of the cup.

From the foregoing it will be apparent that an improved bearing support sleeve has been provided and is designed to permit manufacture in a low cost conventional metal drawing operation involving a number of steps in sequence.

It will also be apparent that there are a number of obvious narrations which fall within the scope of the invention. For example, the term "bearings" is used above but it is obvious that "bushings" and the like also fall within the scope of the invention.

The invention claimed is:

1. A deep drawn metal stamping in the configuration of a "small thin walled" bearing mounting sleeve, said sleeve comprising a radially extending flange at one end, a hollow cylindrical sleeve body portion integral with the flange projecting axially therefrom and a radially inwardly extending portion integral with the body portion at an end opposite the radial flange, and at least one bearing locating shoulder formed in the body portion and facing toward the flange end, said shoulder extending radially inwardly from the inner wall of the body portion and around at least a substantial part of said inner wall so as to engage and axially locate one end of a bearing mounted within the sleeve.

2. A deep drawn metal stamping as set forth in claim 1 wherein the body portion of the sleeve is of reduced diameter cross section on the side of the shoulder opposite the flanged end of the sleeve, said reduced diameter portion having a second shoulder extending radially inwardly from the inner wall and facing toward the flanged end of the sleeve, the second shoulder extending around at least a substantial part of said reduced portion inner wall and serving to engage and axially locate a second and diametrically smaller bearing mounted within the sleeve.

3. A deep drawn metal stamping as set forth in claim 2 wherein said second shoulder is formed at the end of the reduced diameter section and includes a plurality of small circumaxially spaced angularly inwardly projecting fingers which engage and axially load the associated bearing.

4. A deep drawn metal stamping as set forth in claim 2 wherein at least one of said first and second shoulders is provided with a small spring biasing member to engage and axially load the associated bearing.

5. A deep drawn metal stamping as set forth in claim 4 wherein both of said first and second shoulders are provided with small spacing biasing members to axially load their associated bearings.

6. A deep drawn metal stamping as set forth in claim 2 wherein first and second series of circumaxially spaced axially elongated crush ribs are formed respectively adjacent to the first and second shoulders on the sides thereof facing the flange, the ribs projecting slightly radially inwardly from the inner wall of said body portion of the shell and engaging the outer walls of bearings associated respectively with the shoulders in a press fit whereby to radially load the same.

7. A deep drawn metal stamping as set forth in claim 1 wherein a short end portion of the sleeve axially opposite the flange is diametrically reduced to provide a mounting surface engageable with a complementary cylindrical opening in a bearing housing or the like to locate the sleeve both axially and radially.

8. A deep drawn metal stamping as set forth in claim 1 wherein said radial flange at one end of said sleeve has a plurality of small circumaxially spaced tabs which extend angulary from the plane of the flange in radially spaced relationship with the body portion of the sleeve and which engage a bearing housing or the like to locate the sleeve in a radial plane.

9. A deep drawn metal stamping as set forth in claim 1 wherein a series of circumaxially spaced axially elongated crush ribs are formed adjacent to the shoulder on the side thereof facing the flange, the ribs projecting slightly radially inwardly from the inner wall of said body portion of the shell and engaging the outer wall of an bearing associated in a press fit whereby to radially load the same.

\* \* \* \* \*